Jan. 28, 1936.  W. L. MORRISON  2,028,945
AUTOMOBILE BUMPER DEVICE
Filed Oct. 9, 1933  5 Sheets-Sheet 1
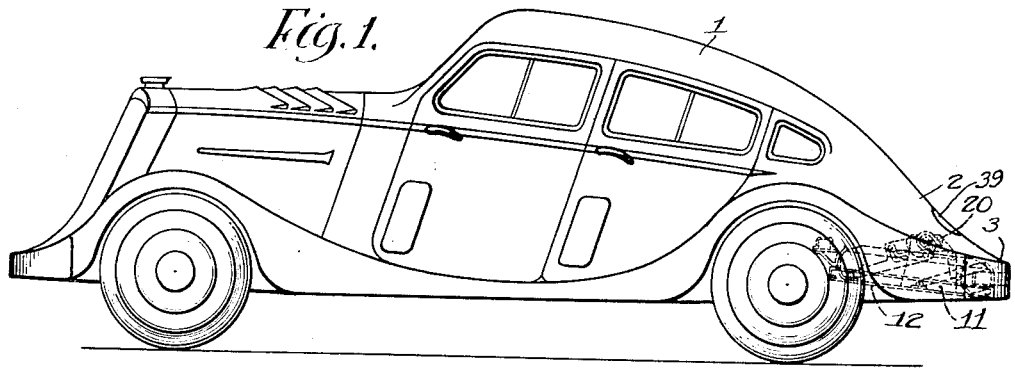
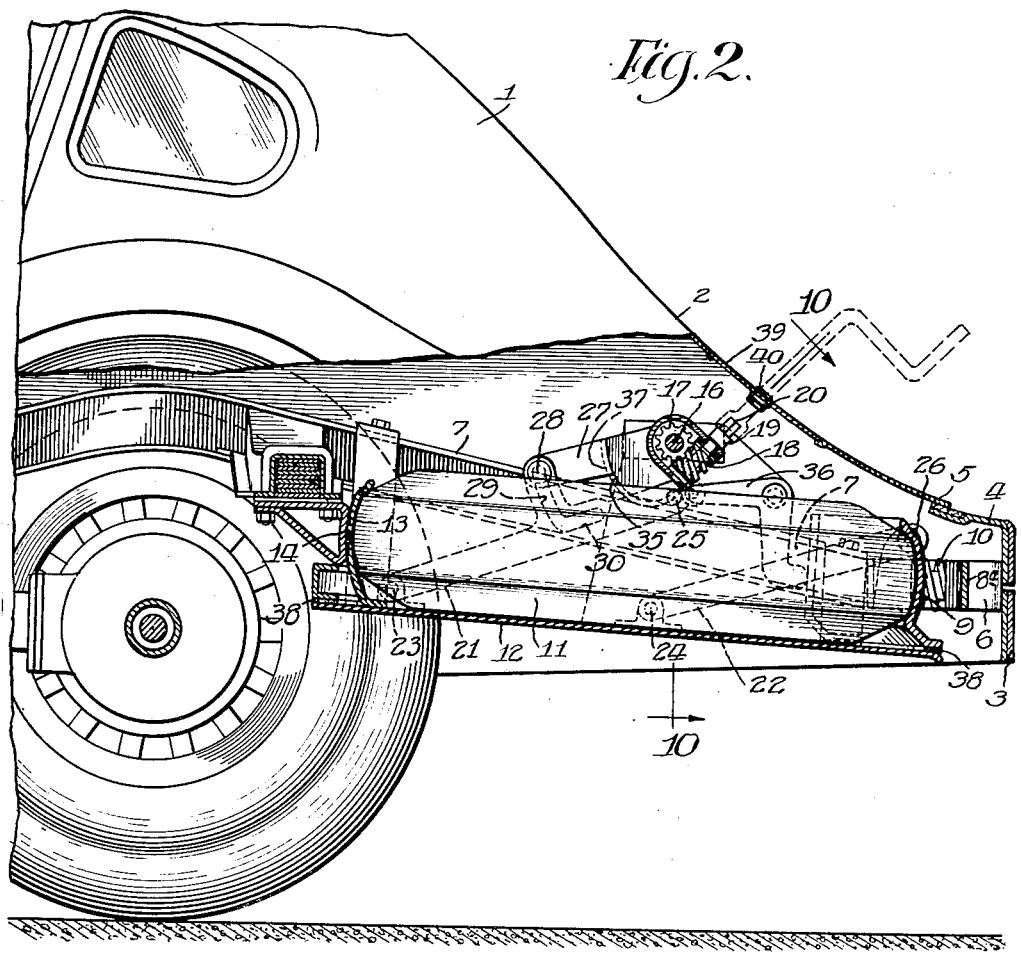
Inventor:
Willard L. Morrison,
By Parker & Carter
Attys.

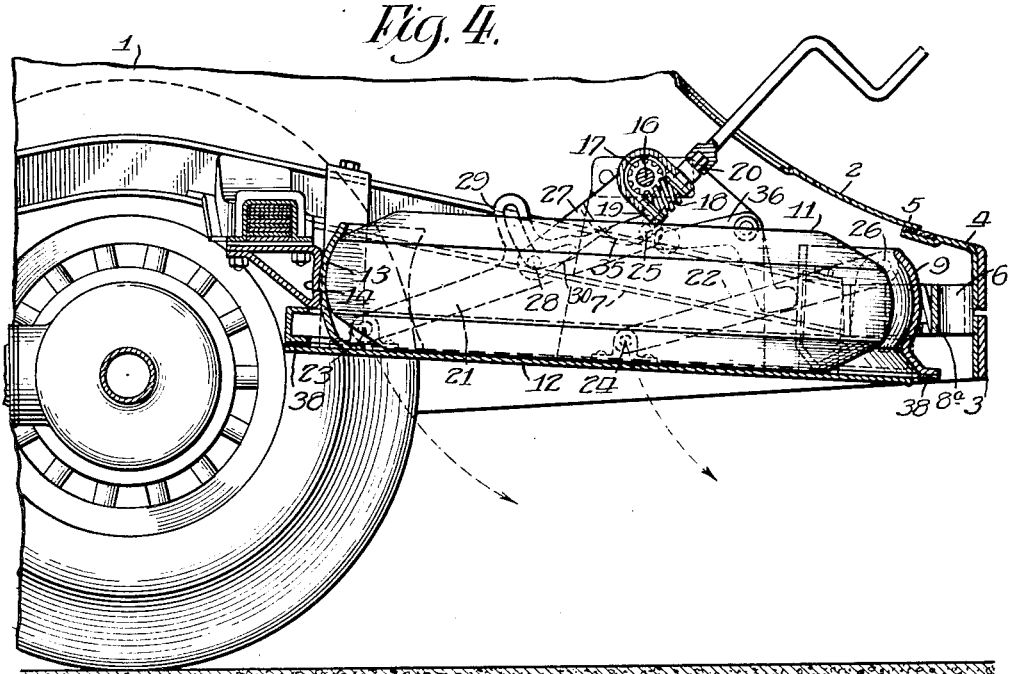

Jan. 28, 1936.  W. L. MORRISON  2,028,945

AUTOMOBILE BUMPER DEVICE

Filed Oct. 9, 1933  5 Sheets-Sheet 5

Inventor:
Willard L. Morrison,
By Parker & Carter
Attys

Patented Jan. 28, 1936

2,028,945

UNITED STATES PATENT OFFICE 2,028,945

AUTOMOBILE BUMPER DEVICE

Willard L. Morrison, Lake Forest, Ill.

Application October 9, 1933, Serial No. 692,730

8 Claims. (Cl. 293—55)

This invention relates to automobile bumper devices and has for its object to provide a new and improved device of this description. The invention has as a further object to utilize the spare tire in resisting impacts on the bumper. The invention has as a further object to utilize the rear tire as a strengthening device for the rear of the automobile body. The invention has as a further object to provide effective and simple means for handling the spare tire. The invention has other objects which are more particularly pointed out in the accompanying description.

Referring now to the drawings, Fig. 1 is a view showing one form of automobile bumper device embodying the invention shown in position on an automobile.

Fig. 2 is a view of the rear end of the automobile;

Fig. 4 is a view similar to Fig. 2 showing the portion of the spare tire during the first movement of the mechanism for releasing it;

Fig. 5 is a view similar to Fig. 4 showing the spare tire entirely released;

Fig. 9 is a sectional view taken on line 9—9 of Fig. 5;

Fig. 10 is a sectional view taken on line 10—10 of Fig. 2;

Fig. 11 is a sectional view taken on line 11—11 of Fig. 3;

Fig. 12 is a sectional view taken on line 12—12 of Fig. 11.

Like numerals refer to like parts throughout the several figures.

Figure 3:
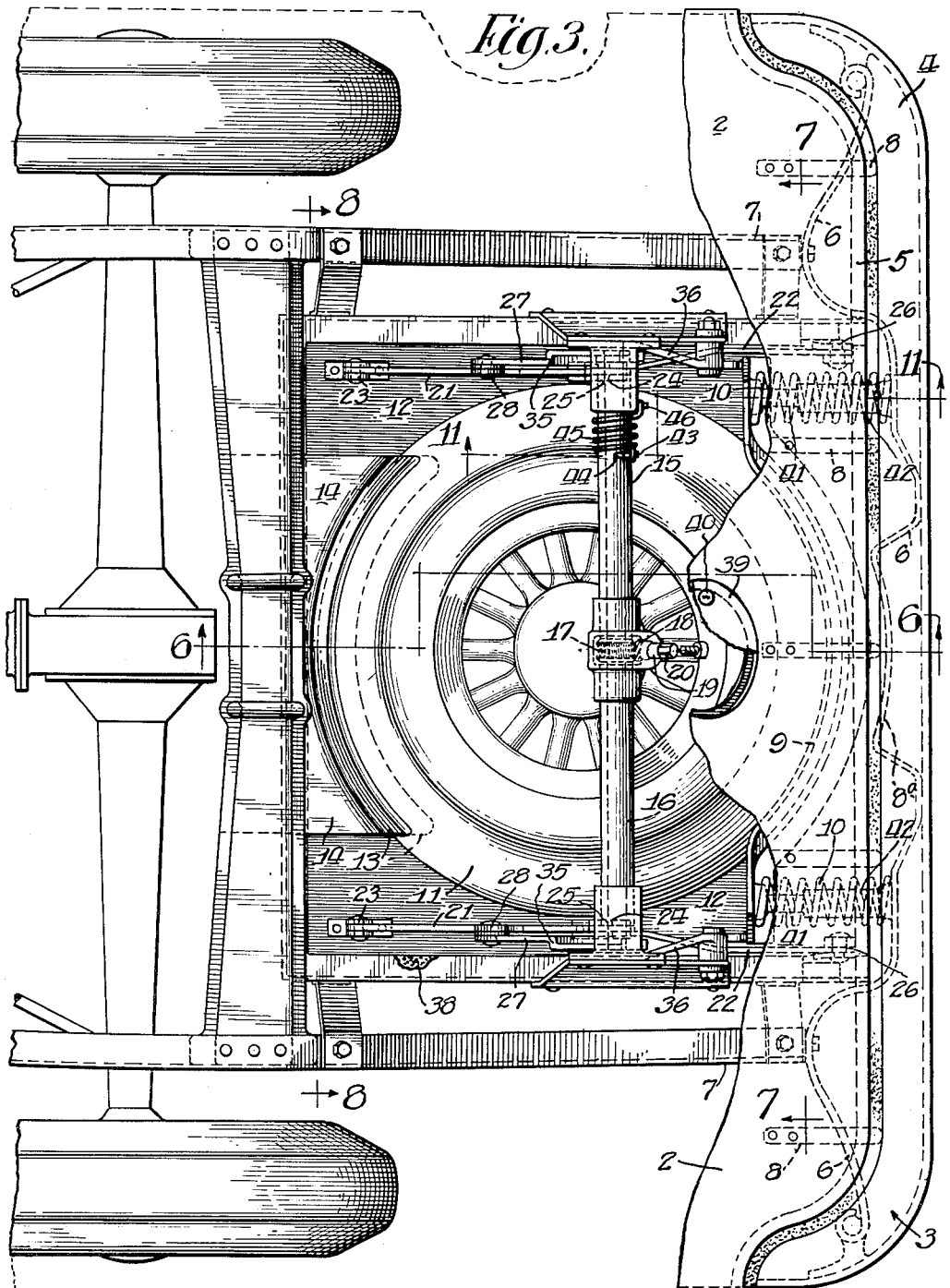
Fig. 3 is a plan view of the rear end of the automobile with parts broken away.
Figure 6:
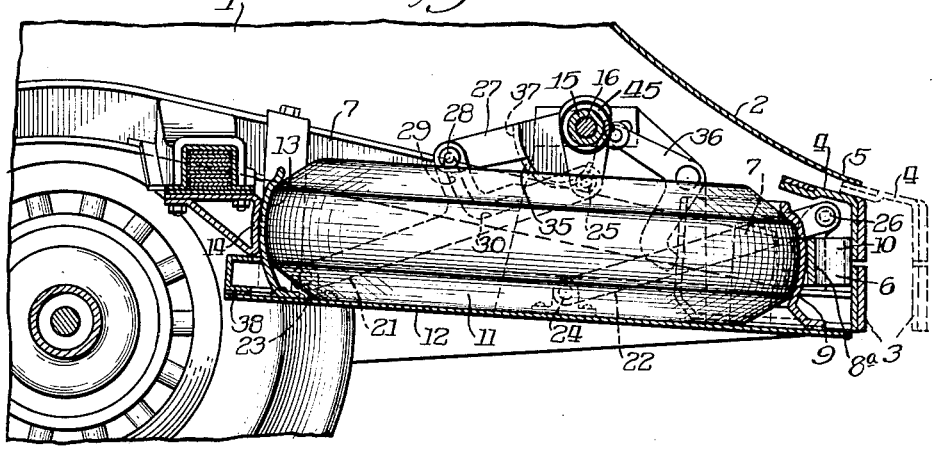
Fig. 6 is a view similar to Fig. 2 taken on line 6—6 of Fig. 3 showing the position of the parts when the rear bumper is struck.
Figure 7:
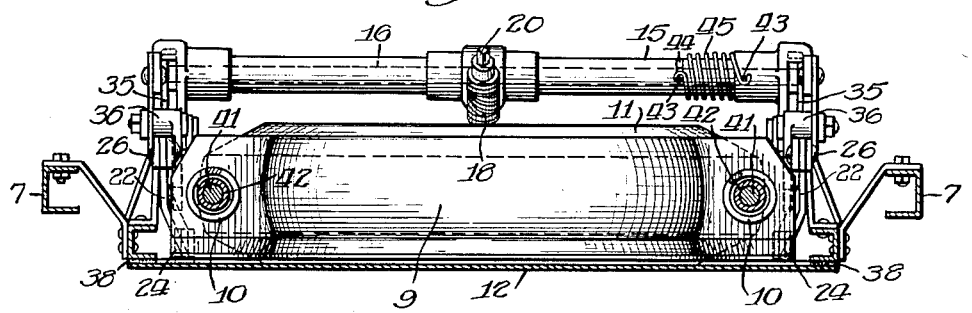
Fig. 7 is a sectional view taken on line 7—7 of Fig. 3.
Figure 8:
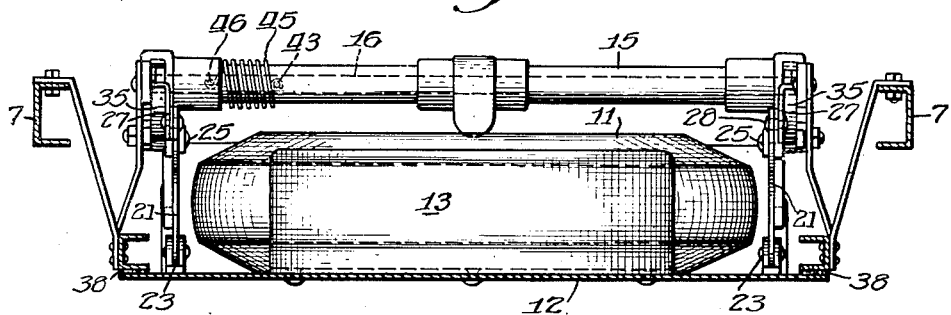
Fig. 8 is a sectional view taken on line 8—8 of Fig. 3.

I have illustrated an automobile having a body 1. This body has a rear portion 2 which extends rearwardly of the rear wheels. A bumper device 3 is attached to the rear of the automobile, and as herein shown is provided with an upwardly bent upper part 4 which projects under the edge 5 of the body. This bumper is attached to the frame of the automobile by means of the member 6 which is connected with the bumper element at intervals and is connected to the members 7 on the frame or chassis of the automobile. There are also spring members 8 attached to the body and to the bumper element to hold it against rattling. The member 6 is provided near the middle with an inwardly extending portion 8a. Attached to the automobile is a tire engaging member 9 which is in proximity to the part 8a of the bumper element. The tire engaging member 9 is pressed inwardly by springs 10, the purpose being that when it is in contact with the tire, it compresses the tire to a sufficient extent to prevent movement and a rubbing of the tire. The extra tire or wheel 11 is mounted on a carrying device 12 which has the tire engaging member 13.

When the device is in the bumper resisting position shown in Fig. 2, the tire engaging member 15 engages the resisting member 14 attached to some fixed part of the automobile and the tire is partially compressed between the tire engaging members 9 and 13. Extending across above the spare tire 11 is a member 15 in which is mounted a shaft 16. This shaft is provided with a worm wheel 17. A worm 18 engages the worm wheel 17 and is provided with a shaft 19 having at the end a part 20 for receiving a tool. The carrying device 12 for the wheel or tire has connected therewith at opposite ends the members 21 and 22 which are pivoted at 23 and 24 to the tire carrying member. The member 21 is pivoted at the other end at 25 to a fixed part, and the member 22 is pivoted at 26 to a fixed part.

Connected with the shaft 16 at each end are the arms 27. These arms are provided with pins 28 which work in slots in the members 21. These slots have the two portions 29 and 30 substantially at right angles to each other. During the initial movement of the parts, while the pin is moving about the up and down part of the slot, a cam 35 engages the member 36 which pushes the tire engaging member 9 and moves it away from the tire so as to release the tire. After it has been moved far enough to release the tire, the member 36 rides along the smooth portion 37 of the cam, thus holding the tire engaging member in its releasing position. The pin 28 then moves along the other part 30 of the slot which extends longitudinally along the member 36, and this moves the tire supporting member down to the position shown in Fig. 5.

The tire, or the wheel, when the tire is on the wheel may now be easily removed and substituted for the injured tire and the injured tire placed on the tire supporting member and returned to the position shown in Fig. 2 by simply turning the shaft 16. The tire supporting member is provided with the packing material 38 which extends entirely therearound and which engages the upper enclosing member for the tire, thus forming a tight enclosing device which keeps the parts free from mud, water, dust and the like. The body portion above the shaft 16 is provided with a door 39 having a lock 40 through which access to said shaft is secured, the actuating tool, which may be the same tool used in changing tires, being inserted through the opening due to the opening of the door.

The tire engaging member 9 is preferably curved around the tire, as shown in Fig. 3, and its ends are bent outwardly. Attached to each end is a pin 41 which works in a sleeve 42 attached to the member 6, see Figs. 11 and 12. The cam 35 holds the arm 36 against the member 9 when in the lowered position and prevents the pin 41 from becoming disengaged from the sleeve 42. The member 21 is prevented from being lowered with the arm 27, see Fig. 4 by a counterbalanced spring 45, when the carrying device 21 is lowered, see Figs. 11 and 12. This spring 45 has one end hooked around a pin 43 which is fastened to the shaft 16. The tubular member 15 has the slot 44 through which the pin 43 swings. The other end of the spring 45 is fastened to a fixed pin 46 in the member 15.

When the tire is in bumper resisting position it is slightly compressed between the tire engaging members. If the bumper is struck it is moved forward and the part 8a of the bumper engages the tire engaging member 9 and the force of the blow is resisted by the tire. It will be noted that the tire, which is inflated, is in its maximum resisting position, taking the blow as it does when running along the road on the automobile. It will further be noted that the bumper has a pneumatic resisting device for resisting the impacts received by the bumper.

The tire also acts as a rear collision defense, a safeguard for lives, for it prevents the rear of the automobile body from being demolished or crumpled up, this protecting the people riding in the back seat. The spare tire is entirely concealed under the body, being out of sight. No tire cover is needed and no tire clamps. This construction leaves the exterior of the body entirely free of attached parts which destroy its symmetry, its beauty, or its stream line effect. The tire is safely locked in position. It can be lowered and raised by the lowering mechanism with the expenditure of very little power, so that a woman can very easily change tires when it becomes necessary. The tire is completely protected from side blows which it receives when on the outside of the body. This construction provides both a tire support and a bumper resisting device.

I claim:

1. An automobile bumper device comprising a bumper, a resisting part, a tire, two tire engaging members on opposite sides of the tire, one adapted to be held by said resisting part, the other tire engaging member engaged by a part on the bumper when the bumper is struck a blow, whereby the tire acts to resist the blow on the bumper.

2. An automobile bumper device comprising a bumper, a resisting part, a tire, two tire engaging members on opposite sides of the tire, one adapted to be held by said resisting part, the other tire engaging member engaged by a part on the bumper when the bumper is struck a blow, whereby the tire acts to resist the blow on the bumper, a movable supporting device for said tire, and a lowering device for lowering said tire to an accessible position.

3. An automobile bumper device comprising a bumper, a resisting part, a tire, two tire engaging members, on opposite sides of the tire, one adapted to be held by said resisting part, the other tire engaging member engaged by a part on the bumper when the bumper is struck a blow, whereby the tire acts to resist the blow on the bumper, one of said tire engaging members supported on the body, a movable supporting device for the other tire engaging member, means for separating the tire engaging members to release the tire, and a lowering mechanism for lowering the tire to a position where it may be removed from the supporting device.

4. An automobile bumper device comprising a bumper, a resisting part, a tire, two tire engaging members on opposite sides of the tire, one adapted to be held by said resisting part, the other tire engaging member engaged by a part on the bumper when the bumper is struck a blow, whereby the tire acts to resist the blow on the bumper, one of said tire engaging members supported on the body, a movable supporting device for the other tire engaging member, means for separating the tire engaging members to release the tire, and a lowering mechanism for lowering the tire to a position where it may be removed from the supporting device, an enclosing part above the tire, the movable tire supporting device when in its up position cooperating with said enclosing part to enclose said tire.

5. An automobile bumper device comprising a bumper, a movable tire supporting member below the rear end of the body for supporting the tire in a substantially horizontal position, a stop device, the tire being inserted between the stop device and the bumper to resist the inward movement of the bumper, and a lowering mechanism for lowering said tire supporting member to a position where the tire can be removed therefrom.

6. An automobile body comprising a movable tire supporting member below the rear end of the body for supporting the tire in a substantially horizontal position, a stop device for said tire, and a lowering mechanism for lowering said tire supporting member to a position where the tire can be removed therefrom, and a bumper in proximity to said tire, said tire located between said bumper and said stop and acting, when in its up position, to resist the movement of said bumper when it is struck.

7. An automobile bumper device comprising a bumper, a stop device at a distance from the bumper, a pneumatic tire supported between the stop device and the bumper and acting to oppose the movement of the bumper when the bumper is struck.

8. An automobile bumper device comprising a bumper, a stop device at a distance from the bumper, a pneumatic tire supported between the stop device and the bumper and acting to oppose the movement of the bumper when the bumper is struck, a portion of the body being located above the pneumatic tire and covering it.

WILLARD L. MORRISON.